(12) United States Patent
Haartsen et al.

(10) Patent No.: US 12,401,199 B2
(45) Date of Patent: Aug. 26, 2025

(54) DUAL-POWER ELECTRICAL OUTLETS

(71) Applicant: Koolbridge Solar, Inc., Wrightsville Beach, NC (US)

(72) Inventors: Jacobus Cornelis Haartsen, Rolde (NL); Curtis Wayne Thornton, Pittsboro, NC (US); Paul Wilkinson Dent, Pittsboro, NC (US)

(73) Assignee: KOOLBRIDGE SOLAR, INC., Wrightsville Beach, NC (US)

( * ) Notice: Subject to any disclaimer, the term of this patent is extended or adjusted under 35 U.S.C. 154(b) by 1273 days.

(21) Appl. No.: 16/469,352

(22) PCT Filed: Dec. 13, 2017

(86) PCT No.: PCT/US2017/065981
§ 371 (c)(1),
(2) Date: Jun. 13, 2019

(87) PCT Pub. No.: WO2018/111977
PCT Pub. Date: Jun. 21, 2018

(65) Prior Publication Data
US 2020/0014206 A1   Jan. 9, 2020

Related U.S. Application Data

(60) Provisional application No. 62/433,671, filed on Dec. 13, 2016.

(51) Int. Cl.
*H02J 3/00* (2006.01)
*H01R 13/66* (2006.01)
(Continued)

(52) U.S. Cl.
CPC .......... *H02J 3/381* (2013.01); *H01R 13/6675* (2013.01); *H01R 13/6683* (2013.01);
(Continued)

(58) Field of Classification Search
CPC ...... H02J 3/005; H02J 3/383; H01R 13/6675; H01R 13/6683; H01R 13/70; H01R 25/006
See application file for complete search history.

(56) References Cited

U.S. PATENT DOCUMENTS

| 4,995,017 A | 2/1991 | Sellati et al. |
| 5,790,394 A * | 8/1998 | Cabaniss ................... H02J 3/38 363/65 |

(Continued)

FOREIGN PATENT DOCUMENTS

WO   2018102415 A1   6/2018

*Primary Examiner* — Daniel Kessie
*Assistant Examiner* — Brian K Baxter
(74) *Attorney, Agent, or Firm* — COATS & BENNETT, PLLC

(57) ABSTRACT

The selection of electrical power supplied to a load, between a first power source such as the electric utility grid, and a second power source such as a solar-charged battery-inverter system, is made at the granularity of individual electrical outlets (or junction boxes for appliances directly connected or loads installed as fixtures). A central controller determines the power source for each outlet, based on numerous factors including the current consumed by that outlet's load(s). The controller addresses power selection commands to each outlet. Each outlet includes a SPDT functionality switch that operates in response to the controller to connect loads to a line conductor from the first power source or a line conductor from the second power source. A common neutral conductor connects to both sources. The outlets include current monitoring, and may include GFCI and/or AFCI protection. A variety of power distribution panel configurations and wiring options are disclosed. A power line communication system is disclosed for communicating at least current consumption in the uplink and power source selection commands in the downlink.

20 Claims, 10 Drawing Sheets

(51) Int. Cl.
*H01R 13/70* (2006.01)
*H01R 25/00* (2006.01)
*H02J 3/38* (2006.01)
*H02J 3/40* (2006.01)

(52) U.S. Cl.
CPC .......... *H01R 13/70* (2013.01); *H01R 25/006* (2013.01); *H02J 3/007* (2020.01); *H02J 3/40* (2013.01); *H02J 2300/24* (2020.01)

(56) References Cited

U.S. PATENT DOCUMENTS

| | | | |
|---|---|---|---|
| RE36,833 E | 8/2000 | Moore et al. | |
| 6,356,470 B1* | 3/2002 | Sadler | H02J 1/102 363/65 |
| 8,649,143 B2* | 2/2014 | Gass | H02H 3/20 361/91.1 |
| 8,937,822 B2 | 1/2015 | Dent | |
| 9,035,782 B1* | 5/2015 | Flegel | H02H 3/165 340/644 |
| 9,614,588 B2 | 4/2017 | Dent | |
| 9,735,703 B2* | 8/2017 | Dent | G01R 15/207 324/130 |
| 9,785,213 B2 | 10/2017 | Dent et al. | |
| 9,882,425 B1* | 1/2018 | Flegel | H02J 9/04 |
| 9,998,016 B2* | 6/2018 | Vermulst | H02M 3/33538 |
| 10,056,722 B1* | 8/2018 | Ingram | H01R 13/713 |
| 2005/0141154 A1* | 6/2005 | Consadori | B60R 16/023 361/62 |
| 2008/0150363 A1* | 6/2008 | Kuo | H02J 9/06 307/64 |
| 2009/0103228 A1* | 4/2009 | Elderbaum | H01H 9/167 361/187 |
| 2009/0251003 A1 | 10/2009 | Umemura et al. | |
| 2009/0267417 A1* | 10/2009 | Lee | H02M 1/10 307/65 |
| 2010/0008692 A1 | 1/2010 | Kim et al. | |
| 2010/0127567 A1* | 5/2010 | Bisinella | H01R 13/70 307/29 |
| 2010/0127691 A1* | 5/2010 | Gass | G01R 19/0084 324/76.11 |
| 2011/0148204 A1* | 6/2011 | DiMarco | H02J 9/062 307/65 |
| 2012/0128078 A1 | 5/2012 | Billingsley et al. | |
| 2012/0248879 A1* | 10/2012 | Arrigoni | G05B 17/02 307/80 |
| 2012/0306285 A1* | 12/2012 | Kim | B60L 53/36 307/104 |
| 2013/0076132 A1 | 3/2013 | Cohen et al. | |
| 2013/0212419 A1* | 8/2013 | Hilburn | G06F 1/3203 713/340 |
| 2013/0320769 A1 | 12/2013 | Sawyers | |
| 2014/0084687 A1 | 3/2014 | Dent | |
| 2014/0153145 A1* | 6/2014 | Hughes | H02H 11/00 361/49 |
| 2014/0210428 A1* | 7/2014 | Mauder | G05F 1/70 323/210 |
| 2015/0002137 A1* | 1/2015 | Patel | G01R 15/207 324/130 |
| 2015/0008747 A1* | 1/2015 | Salcone | H02J 7/34 307/66 |
| 2015/0087169 A1 | 3/2015 | Elwart | |
| 2015/0234440 A1* | 8/2015 | Gardner | H05K 7/1492 713/300 |
| 2015/0249337 A1 | 9/2015 | Raneri et al. | |
| 2015/0255981 A1* | 9/2015 | Byrne | H02J 3/00 307/126 |
| 2015/0288225 A1* | 10/2015 | Dent | H02M 1/32 307/66 |
| 2016/0056632 A1* | 2/2016 | Hansson | H02P 7/295 307/52 |
| 2016/0172900 A1* | 6/2016 | Welch, Jr. | H05K 7/1492 307/64 |
| 2016/0224083 A1* | 8/2016 | Dent | G06F 1/266 |
| 2016/0226560 A1* | 8/2016 | Dent | H04L 27/14 |
| 2017/0077704 A1* | 3/2017 | Faley | H02J 5/00 |
| 2017/0126257 A1* | 5/2017 | Wang | H04B 1/0064 |
| 2017/0229875 A1* | 8/2017 | Chen | H02J 5/00 |
| 2017/0256984 A1* | 9/2017 | Ding | H02J 1/14 |
| 2017/0271874 A1* | 9/2017 | Luke | H02J 3/32 |
| 2018/0026619 A1* | 1/2018 | Murao | H03F 1/523 370/278 |
| 2018/0076731 A1* | 3/2018 | Morin | H02J 9/061 |
| 2019/0089104 A1* | 3/2019 | O'Reilly | F21S 9/022 |
| 2019/0207390 A1* | 7/2019 | Restrepo | H02J 3/14 |
| 2020/0014206 A1* | 1/2020 | Haartsen | H02J 3/381 |
| 2020/0169087 A1* | 5/2020 | Galin | H02J 3/38 |

\* cited by examiner

DUAL-POWER ELECTRICAL OUTLETS

RELATED APPLICATIONS

This application claims priority to U.S. Provisional Patent Application Ser. No. 62/433,671, titled "Dual-Power Electrical Outlets," filed Dec. 13, 2016, the disclosure of which is incorporated herein by reference in its entirety.

TECHNICAL FIELD

The present invention relates generally to electrical power distribution in a facility, and in particular to powering electrical outlets with power from different sources.

BACKGROUND

In electrical installations served by an electric utility, power enters the installation at a service entrance into a main service panel. In US residential installations, power entering the main service panel comprises two 120-volt antiphase 60 Hz feeds designated L1 and L2 plus a common neutral, N. In commercial installations, a 3-phase service is often supplied, comprising L1, L2, L3, and N. In other places in the world, a single-phase residential system may comprise only one 240 volt 50 Hz feed L, plus N.

In recent years photovoltaic solar panels have drastically fallen in price leading to the use of free electrical power from sunshine becoming of great interest.

The most common method of exploiting solar energy has been the so-called "grid-tied" system, in which DC power from solar cells is converted to AC power and fed backwards through an electrical meter to offset consumption from the electric utility grid. Many states in the USA have passed regulations mandating that electrical utilities shall permit this so-called net-metering system, in which the cost of power consumed from the grid at one time is offset by a credit received for power fed back to the grid at a different time of day. However, as the amount of installed solar power increases, the electric utilities are starting to experience difficulties in absorbing the total amount of back-fed power during the peak sun hours, and as a result the end is in sight of the economic benefit for consumers in being able to feed power back to the grid when they are not at home to use it.

U.S. Pat. No. 8,937,822 to current inventor Dent describes an alternative solar system to net metering, which instead facilitates self-consumption of own, solar-derived power by using an automatic, circuit-by-circuit transfer switch to select, for each breaker circuit, whether it receives solar power or grid power. The power source selection decision is based on, among other things, the total amount of solar power being received at any moment. In order to use solar power to directly power loads, energy storage, i.e., a storage battery, must be used to average out the difference between solar power instantaneously received and the varying consumption of the home or business. Thus solar energy received when the homeowner is not at home to use it can be stored in the battery and released for use when the user is home.

The circuit-breaker-by-circuit-breaker automatic transfer switching of the above mentioned '822 patent is further described in U.S. Pat. No. 9,735,703. The disclosures of both the '822 and '703 patents are hereby incorporated by reference herein, in their entireties. While single-pole breaker circuits often feed multiple loads such as lighting circuits or electrical outlet chains, some breaker circuits, notably all 2-pole breakers circuits, feed single appliances in a typical US residential installation. It might therefore be considered that a more accurate matching of self consumption to the available alternative energy could be achieved by transferring load between solar and grid on an outlet-by-outlet basis rather than a breaker-circuit-by-breaker-circuit basis. To achieve the former, consideration must be given to the method of control down to the outlet level; to the algorithms used in the controller to achieve objectives of benefit to the home or business owner; to how two sources of power could be made available to each outlet; to how the power needs of an outlet can be signalled to a switching controller, and how to know what is plugged in where, as well as to the provisions of the National Electrical Code that might apply to such an arrangement.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to various embodiments of the present invention disclosed, illustrated, and claimed herein, the selection of electrical power supplied to a load, between a first power source such as the electric utility grid, and a second power source such as a solar-charged battery-inverter system, is made at the granularity of individual electrical outlets (or junction boxes for appliances directly connected or loads installed as fixtures). A central controller determines the power source for each outlet, based on numerous factors including the current consumed by that outlet's load(s). The controller addresses power selection commands to each outlet. Each outlet includes a SPDT functionality switch that operates in response to the controller to connect loads to a line conductor from the first power source or a line conductor from the second power source. A common neutral conductor connects to both sources. The outlets include current monitoring, and may include GFCI and/or AFCI protection. A variety of power distribution panel configurations and wiring options are disclosed. A power line communication system is disclosed for communicating at least current consumption in the uplink and power source selection commands in the downlink.

According to a one embodiment, a chain of single-phase electrical outlets is fed with AC power from a first source, e.g., the electric utility grid, and AC power from a second source, e.g., a solar-charged battery-inverter system, using a cable having two live wires, a common neutral, and a common ground. A cable or conduit therefore comprises a first live wire carrying AC power from one source, a second live wire carrying antiphase power from a different source, a common neutral wire and a common ground which may be the metallic conduit if such is used. A standard cable designated #14/3 may be used for up to 20 amp circuits, the cable comprising a first live wire (black) a second live wire (red) a neutral (white) and a bare copper ground wire.

In this embodiment, the AC power from the second source may be synchronized to be 180 degrees out of phase with the AC power from the first source, so as to ensure that the neutral wire never passes more current than either live wire alone. Furthermore, in jurisidictions where the electrical code requires it, the AC power from the first source and the AC power from the second source are distributed to an outlet chain through a two-pole, mechanically-ganged circuit breaker, having a first breaker pole for interrupting the first AC power source and a second pole for interrupting the second AC power source, thereby ensuring that a single switching action interrupts all power distributed along the wires leading to the same outlet. The two pole mechanically ganged breaker may be a standard 20 amp 2-pole breaker installed in a standard split-phase breaker sub-panel, which is fed on one hotleg by the first AC power source and on the other hotleg by the second AC power source.

Another embodiment comprises feeding a chain of single-phase electrical outlets with AC power from a first source, e.g., the electric utility grid, and AC power from a second source, e.g., a solar-charged battery-inverter system, using one or two cables running in parallel, the two cables together comprising a first live or line wire and associated neutral and ground, the first live wire carrying AC power from the first source, and a second live or line wire and associated neutral and ground, the second live wire carrying AC power from the second AC power source. Two standard cables designated #14/2 may be used for up to 20 amp circuits, each comprising a black live wire of 14 AWG, a white 14 AWG neutral wire and a bare copper ground wire. Alternatively, if available, a single cable comprising two 14 AWG live wires, two 14 AWG neutrals and a common ground may be used. Where local electrical code permits, a first of the live wires designated to carry power from the first source is wired to the output of a single pole circuit breaker in a first breaker panel that distributes power from the first AC power source. Similarly, a second of the live wires that carries AC current from the second AC power source is wired to the output of a single pole breaker in a second breaker panel that distributes power from the second power source. Furthermore, all live wires to the second panel are routed through the first panel and out of the first panel to the second panel through a common section of conduit, along with all of their associated neutrals or a common neutral of adequate total ampacity, the neutral or neutrals connecting the neutral buss of the second panel to the neutral buss of the first panel. In this embodiment, the second AC power source does not need to be synchronized to be out of phase with the first AC power source, and the two neutral wires are joined at both ends of each run to provide an ampacity sufficient to be protected by a trip current equal to the sum of the trip currents of the breakers installed to protect the first live wire and the second live wire, respectively.

The neutral wiring is grounded at only one point in the system, typically the service entrance panel for the electrical utility power. A second source of power may not then have its neutral independently grounded, but rather gets its neutral grounded by the above connection between the neutral busses of the first and second breaker panels.

No Ground Fault Circuit Interruption (GFCI) breakers may be used in either the first or the second panel in this embodiment. If a GFCI function is required, a GFCI outlet compatible with the inventive power selection features shall be used.

In yet another embodiment, a first AC power source feeds one hotleg of a subpanel while a second power source, which need not be synchronized to the first power source, feeds a second hotleg of the same subpanel. One only of the first or the second power source has its neutral grounded at the source, and the neutrals of both sources are connected to the same neutral buss within the subpanel. Double pole, mechanically ganged breakers are fitted in the subpanel and may be purely overcurrent trip breakers, or alternatively may be overcurrent and GFCI breakers, Arc Fault Circuit Interruption (AFCI) breakers, or Combi breakers that provide for combinations of the three types of protection. To the outputs of each double pole breaker are connected two live wires, one for each pole, and a common neutral wire or wires having an ampacity of double the breaker trip rating. The two live wires from each double pole breaker, the associated common neutral wire or wires and a ground wire connected to the ground buss of the panel exit the panel to run to a chain of inventive outlets.

Also disclosed and claimed herein are a number of new and inventive electrical outlets.

Each inventive electrical outlet, for all embodiments of the invention, comprises a single-pole, double-throw functionality selection switch, such as an SPDT relay, that may be commanded to select either the first or the second live wire to power the live terminal of the outlet socket. The common neutral wire or wires connect to the neutral terminal of the outlet socket and the common ground wire or wires connect to the ground terminal of the outlet socket. Each outlet also preferably contains a current measuring device, such as a pick-up coil or a Hall-effect device, to measure the current taken by a load plugged into the outlet. An additional inventive type of outlet provides a GFCI function for its own socket as well as for all other downstream outlets daisy-chained from it, while preserving their ability to select either power source. Yet another type of inventive outlet provides an AFCI function for its own socket and for all downstream outlets daisy-chained from it, while preserving their ability to select either power source. Another type of outlet combines GFCI and AFCI functions.

The power source selection relays in each of the inventive outlets are controlled by an inventive central controller containing processing circuitry such as a microprocessor. The processing circuitry addresses commands to each relay to energize it or de-energize it via a communications system. The communications system may be a wireless communications system, a wired communications system using a separate control cable, or a power-line communications system that impresses communications signals on to the power lines. The communications system may provide for reverse data flow so that the processing circuitry can read the currents taken by loads plugged into each outlet.

The processing circuitry may also be provided with information relating to each power source. For example, when one power source is a solar-charged battery-inverter system, the processing circuitry may be provided with information on the battery charge state and/or the amount of solar power currently being received. The processing circuitry may also communicate with a user device such as a PC, tablet, or smartphone via cable, wireless, or an Internet connection to receive user commands or information from a server on the internet. The processing circuitry uses all the information fed to it to decide which outlets to power from the first AC power source and which outlets to power from the second AC power source, in order to achieve a functionality of benefit to the user. For example, it may seek to minimize the consumption of power from the grid during times when the tariff is high, while keeping the battery charged for use during a grid outage.

One embodiment relates to a dual-power electrical outlet operative to selectively power one or more loads from a first electrical power source or a second electrical source, in response to commands from a controller. The dual-power electrical outlet includes a first line input terminal operative to connect to a power conductor from the first electrical power source; a second line input terminal operative to connect to a power conductor from the second electrical power source; and a neutral terminal operative to connect to a common neutral conductor connected to both the first and second electrical power sources. The dual-power electrical outlet also includes a communication circuit operative to receive a power selection command from the controller; and a single pole, double throw functionality switch operative to direct power from either the first line input terminal or the second line input terminal to connected loads, in response to the power selection command.

Another embodiment relates to an electrical outlet controller operative to control a plurality of dual-power electrical outlets individually to selectively supply connected loads with electrical power from a first electrical power source or a second electrical power source. The controller includes processing circuitry operative to determine, for each individual dual-power electrical outlet, whether the outlet should power connected loads from the first or second electrical power source. The controller further includes communication circuitry operative to address a power source selection command individually to each dual-power electrical outlet.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
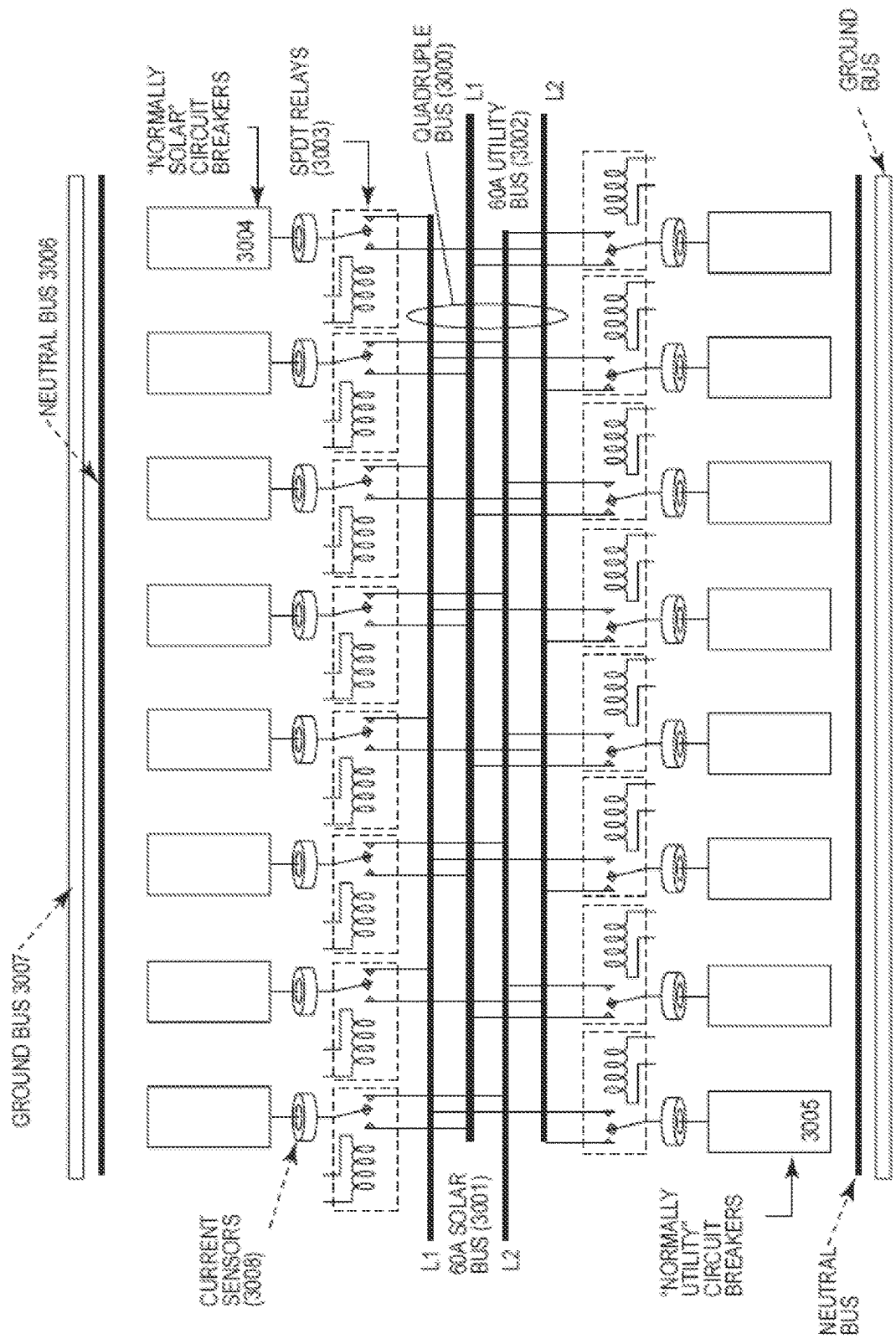
FIG. 1 is a schematic diagram depicting the circuit-by-circuit transfer switching of the '822 patent.

FIG. 1 shows the arrangement for circuit-by-circuit transfer switching, as disclosed in the above-incorporated '822 patent. The arrangement is contained in a new kind of circuit breaker panel having a quadruple bussbar (3000) instead of the normal two busses. The quadruple bussbar carries the two hotlegs L1 and L2 from the grid supply on buss lines (3002) as well as two L1, L2 hotlegs from an alternative supply such as a solar-charged battery-inverter system on buss lines (3001). Two rows of circuit breakers (3004) at the top and (3005) at the bottom each receive power selected by an associated relay (3003) from a solar buss line or a utility buss line. If desired, it can be arranged that some of the relays select solar power in the unenergized state while others select power from utility in the unenergized state. Alternatively, all relays can default to selecting utility power in the unenergized state, but either way, an internal microprocessor controller may be set up by the user to override, for each circuit, the default power source selection upon power-up. Also shown are current sensors (3008) which may be pick-up coils or Hall Effect sensors to measure the current taken by each breaker circuit. The measured current is digitized and read into the microcontroller (not shown) which in a current design based on the invention disclosed in the '822 patent is an Atmel AVR ATMEGA1284PU plus two ATTiny microcontrollers. The latter each comprise eight Analog To Digital converter inputs which are used respectively to read the upper and lower rows of current sensors (3008) of FIG. 1.

Alternate ones of the breakers are connected through the relays to alternative ones of the L1, L2 hotlegs which are normally 180 degrees out-of-phase, thus allowing a 2-pole breaker occupying two adjacent slots to receive 240 volts pole-to-pole. When a 2-pole relay is installed to power a 240-volt appliance, the controller software that drives relays (3003) ensures that both are switched to solar power at the same time or both are switched to grid power. The unit also contains a neutral buss proximate to each row of breakers, and the neutrals of both the grid supply and the solar derived supply are connected to both neutral busses and thus to each other. Reference is made to international patent application PCT/US2017/063715, which is hereby incorporated by reference herein in its entirety, for a discussion of neutral routing and grounding issues in installations having two sources of electrical supply. The neutral busses are used to attach the neutral return wires of circuits connected to regular overcurrent protection breakers, or alternatively to attach the pigtails of Ground Fault or Arc Fault breakers. In addition, the unit contains ground busses proximate to each row of breakers to attach the grounding wires of each circuit wiring run.

One of the major merits of using the invention of FIG. 1 to select between solar and utility power on a circuit by circuit basis is that the selection relays are ahead of the breakers, and thus only a single breaker per circuit is required. In the inventive outlet-by-outlet power source selection method described below, the selection must however be done after the circuit breakers, and thus one breaker must be used for the utility supply to the outlets of a particular circuit and another breaker for the alternative supply for that circuit.

Figure 2:
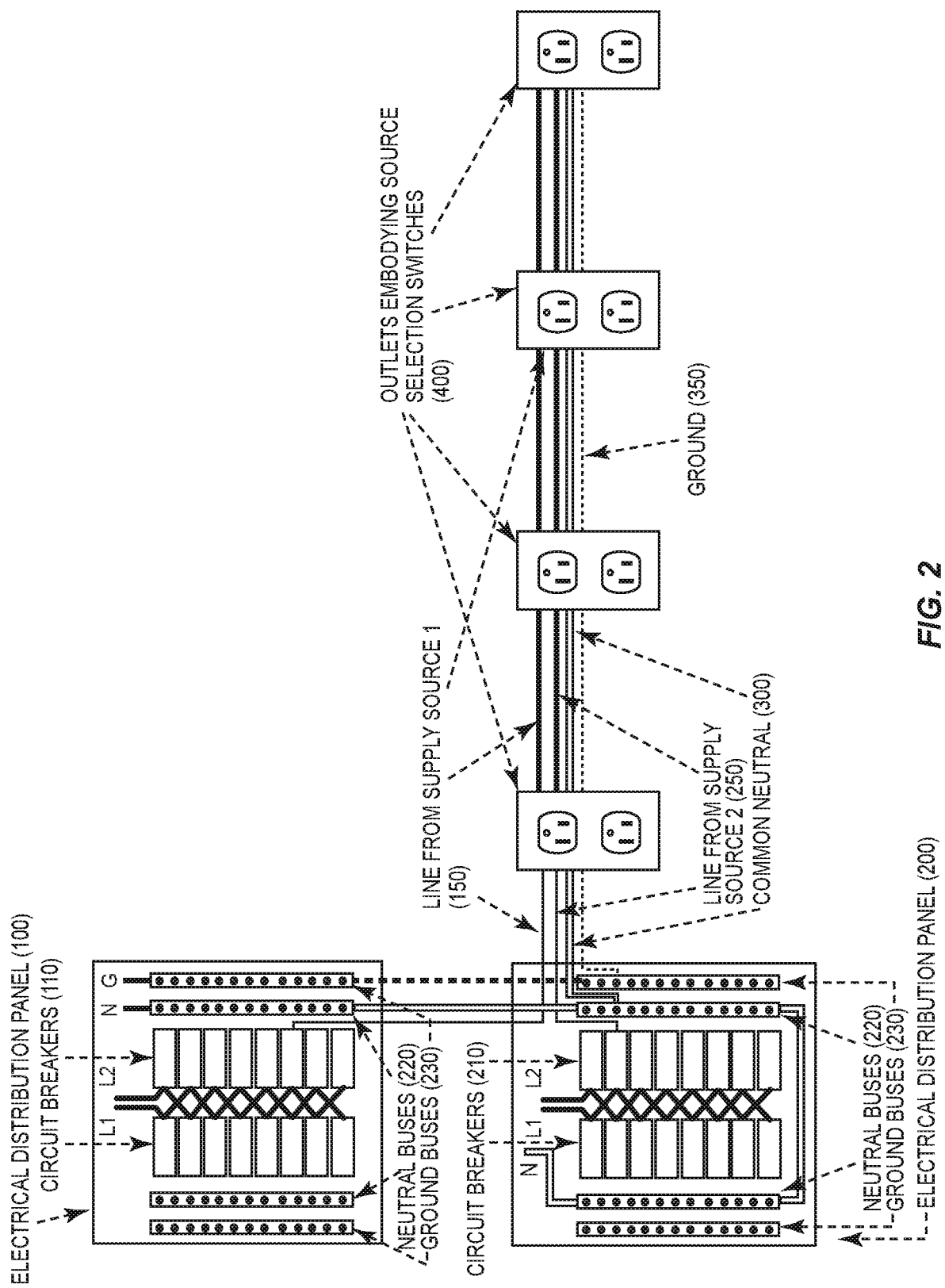
FIG. 2 is a schematic diagram depicting one embodiment of outlet-by-outlet transfer switching.

FIG. 2 shows the principle of outlet-by-outlet power source selection. A first electrical distribution panel (100) receives hotlegs L1, L2, Ground, and Neutral from a first source such as the utility grid. When the power source is the utility grid, the neutral may be bonded to ground at a single place only, which is in or near the main service entrance panel. Electrical panel (100) may be the service entrance panel containing the main service disconnect breakers and providing the neutral bonding to ground, or else it may be a subpanel receiving hotlegs L1 and L2, ground G and already grounded neutral N from the service entrance panel by means of a 4-wire feeder cable. A second electrical distribution panel (200) receives hotlegs L1 and L2 and a not-yet grounded neutral N from an alternative power source such as a solar-charged battery-inverter system. The solar inverter neutral is strapped to the utility neutral by a neutral wire running between panel (100) and panel (200) and a ground wire likewise runs from panel (100) to panel (200) to connect the ground buss of panel (200) back to the main system ground coming into panel (100). The solar inverter may therefore not have its neutral grounded at source, as that would create two separately grounded neutral points, leading to neutral current partially flowing in grounding wires, with unpredictable consequences.

Each distribution panel (100, 200) contains a set of breakers for supplying circuits and appliances. Panel (100) contains the breakers for circuits to be fed from the first power source (e.g., utility), and panel (200) contains the breakers to be used for feeding circuits powered by the second source (e.g., solar inverter).

A new and inventive type of outlet (400) receives power from both sources, and may contains either a manual or remote-controlled selection switch (e.g., a relay) for selecting at each outlet whether it takes power from the first or the second source to power its load. Therefore power lines must be drawn both from a breaker in distribution panel (100) and a breaker in distribution panel (200). When a relay is used, a remote controller can be used to effect automatic transfer switching to ensure an uninterrupted supply. The duration of the glitch upon transfer switching is approximately a half cycle due partly to relay operation time and partly to the change of phase upon switching sources, if they are not synchronized in-phase.

An outlet (400) of the simplest type does not select a different neutral wire when selecting a different power source. Therefore, a common neutral accompanies power lines from both sources to outlets (400). In fact, a standard #14/3 cable contains two power lines (red and black), a common neutral (white) and a bare copper ground wire. Thus the outlets can be wired using a standard cable, pending the further discussion on neutral ampacity below.

An outlet could alternatively be constructed to select both the neutral and the live wires from the selected source, using a Double Pole, Double Throw (DPDT) relay. In that case, single pole GFCI breakers may be used in both panels (100) and (200) if the circuit requires GFCI protection.

In conformance with the principles of routing neutral and line wires from two sources described in the above-incorporated '715 PCT application, the line connections drawn from panel (100) accompany the neutral connection drawn from panel (100) to panel (200) so that line and neutral currents balance in the conduit or cable connecting the two panels. Since the neutral must carry the currents for all line wires that may be drawn from panel (100) to panel (200), it is likely to be of a heavier gauge, and cables containing wires of different gauges are not typically available. Therefore the connection between panel (100) and panel (200) would likely comprise wires of various gauges in conduit.

In FIG. 2, Ground Fault Circuit Interrupting (GFCI) breakers will not function correctly if installed in panels (100) or (200) when a common neutral is used. GFCI breakers function by measuring the imbalance between the current in the live wire to a load and the return current in the neutral wire. If these are not equal and opposite, it indicates that current is leaking to an unintended place, and the breaker trips. A GFCI breaker therefore has terminals for both the live and the neutral wires of a load or outlet chain, and the neutral current flows through it and back to the neutral buss through a breaker "pigtail." However, in the arrangement of FIG. 2, the common neutral of an outlet chain must connect to a first breaker in panel (100) and a second breaker in panel (200). The current in neutral and live could only at best be expected to balance in that breaker associated with the selected power source, causing the other breaker to trip if it is of GFCI type. When some outlets select one power source and other outlets select the other power source, it is a near certainty that both breakers will trip, if of GFCI type. Therefore, if GFCI protection is required, it must be provided at the outlet in the dual-panel configuration unless outlets are used that also select the neutral from the same panel as the live line.

GFCI outlets in the current art can provide GFCI protection for all other outlets downstream. They do not provide for protection upstream as they can only interrupt the power that they pass on to the downstream outlets. They measure the current imbalance between the one live and one neutral wire connecting the GFCI outlet to the source. Thereby, if the GFCI outlet, or any downstream outlet it feeds, causes a current imbalance between live and neutral, the power to its own socket as well as to all the downstream outlets is interrupted. It is typical also for a GFCI outlet to open the neutral wire as well as the live wire when it trips. A standard prior art GFCI outlet will not, however, provide a daisy-chained GFCI function for downstream outlets in FIG. 2, because of the presence of two live wires, which it is not designed to interrupt.

It is possible to use a prior art GFCI outlet with the wiring of FIG. 2 to provide a GFCI function for its own socket. The inventive source selection relay and associated circuitry is placed ahead of the outlet and the selected live wire only is routed to the GFCI outlet along with the neutral and ground. That outlet may also be daisy chained with other standard outlets connected downstream, but they all receive the same source of power selected by the relay ahead of the GFCI outlet. This is little different than the function provided by FIG. 1, in which all outlets in a chain receive power from the same source.

On the other hand, a new type of inventive GFCI outlet may be configured to provide a GFCI function for daisy-chained outlets, while still preserving their freedom to select either power source. This arrangement will be discussed later with reference to FIG. 5. A convenient method of providing GFCI protection for an outlet chain while preserving the ability of each inventive outlet to select either power source is, however, to use a 2-pole GFCI breaker installed in the single-panel arrangement of FIG. 3, which also solves other issues with FIG. 2 in US installations.

Referring still to FIG. 2, in a standard #14/3 cable, the neutral is of the same gauge as the two line wires. In principle, the total current should not change, depending on whether a first source or a second source is selected by any outlet to power a load. However, if source 1 is selected by some outlets and source 2 by others, the total current available from source 1 is limited by the breaker in panel (100) while the total available current from source 2 is limited by a breaker in panel (200). Therefore, the neutral current is not limited by a single breaker, but rather by the sum of the trip currents of two breakers, and may not be adequately protected against overcurrent. To avoid the latter issue, one solution is to double the ampacity of the neutral wire by using instead two lengths of #14/3 to connect the outlets. A second solution is to synchronise source 2 with source 1 and to select the opposite phase of source 2 to run to the outlets from panel (200) as compared to the source 1 phase selected from panel (100), thereby ensuring that the neutral currents cancel rather than add. This is the normal assumption used for sizing the neutral wire for 2-pole circuits using antiphase hotlegs. The latter solution is further suggested by another issue with the solution of FIG. 2.

In the USA, the National Electrical Code (NEC) embodies all of the best practices that shall be used in wiring up electrical systems to ensure safe and efficient operation. Other countries may have different standards. One of the safety principles is that, when two hotlegs are run to an outlet or appliance, they shall be de-energized by a single (i.e., 2-pole) breaker. It can be understood that, if a breaker in panel (100) was marked, for example, "Laundry Room Outlets," then conventional wisdom suggests that flipping that breaker would de-energize the outlets in the Laundry Room, rendering them safe to work on. This is not so, however, in the case of FIG. 2, as panel (200) would also contain a breaker marked "Laundry Room Outlets," which would also have to be flipped to disconnect the outlets from source 2 as well as well as from source 1. Other jurisdictions may allow reliance on suitable warning notices installed at each breaker indicating that the other breaker must also be operated to ensure complete de-energization of an outlet or cable run, thus allowing FIG. 2 to be used in those jurisdictions.

Figure 3:
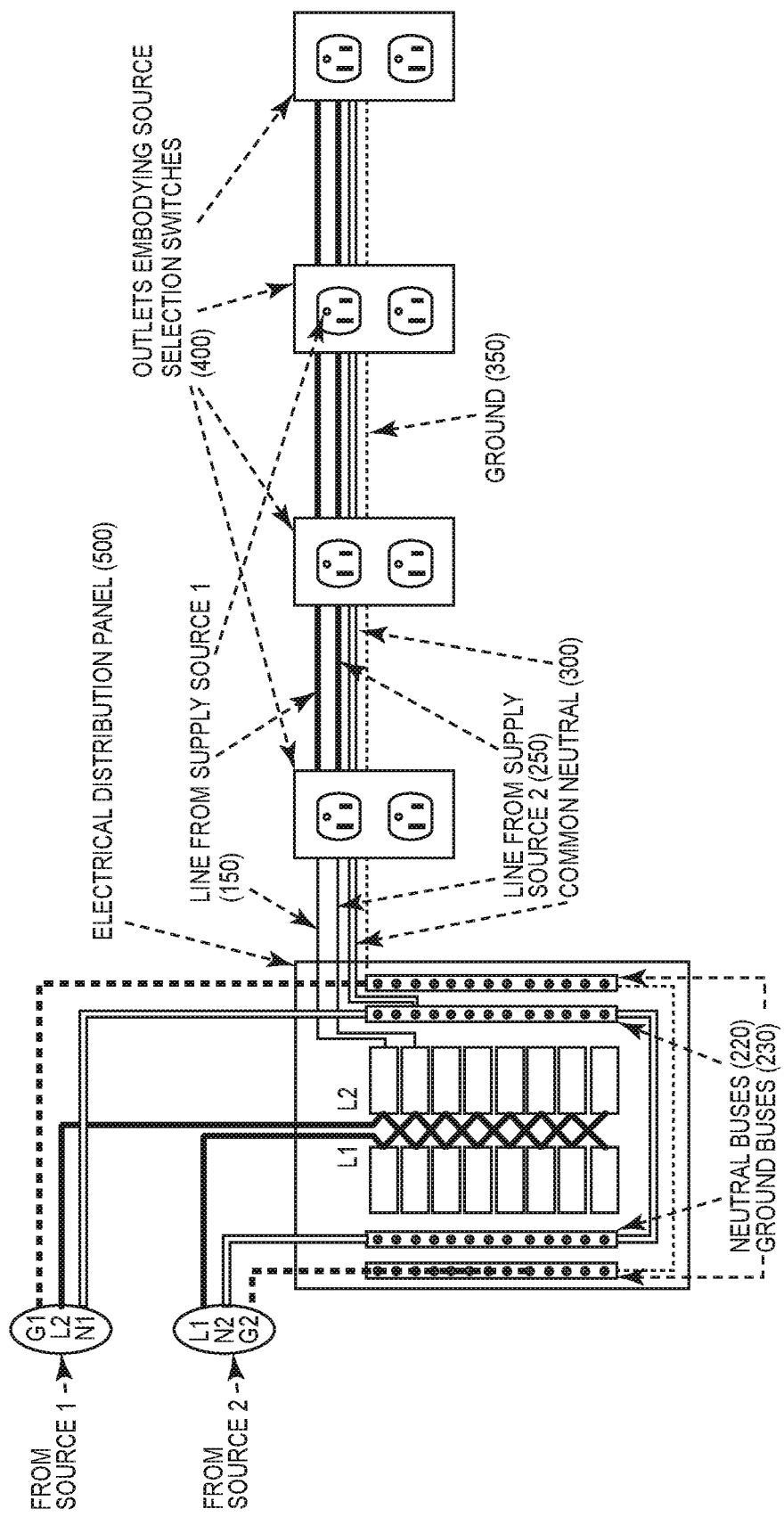
FIG. 3 is a schematic diagram depicting another embodiment of outlet-by outlet transfer switching.

FIG. 3 shows a second solution that solves the Code compliance issue with FIG. 2. In FIG. 3, an electrical panel (500) now receives the L2 phase from source 1 and an L1 phase from source 2. Source 2 may be synchronized to source 1 such that its L1 phase is 180 degrees out of phase with the L2 phase of source 1. Thus a standard split-phase panel can be used for panel (500)—although it may not ought to be used for 240 volt appliances to avoid them receiving half of the 240 volts from one source and the other from a different source, even if the L1 and L2 legs are synchronized in antiphase. Such an occurrence would have to be carefully evaluated before allowing that to happen, and since that is not the intention of FIG. 3, it is not discussed further. The intention of FIG. 3 is to allow a standard panel to supply single phase outlets or appliances with alternative sources of power by supplying one phase of split-phase panel (500) from the first source and the other phase from the second source; then standard two-pole breakers can be used to allow a single breaker flip to de-energize the outlets from being powered by either source. Moreover, synchronizing the two sources to supply out-of phase hotlegs guarantees that the ampacity of the neutral feed to the outlets can be satisfied with a standard #14/3 cable. Of course, higher gauge cables such as #12/3 or #10/3 can be used for higher currents, or to reduce voltage drop for long runs.

Recent versions of the National Electrical Code now specify that power to many of the rooms of a residence shall be supplied with power via Arc Fault breakers. 2-pole Arc Fault breakers are available to be used in this invention in panel (500) to allow power from two alternate sources to be routed to every outlet while meeting the requirement for Arc Fault breakers to be used.

Arc fault protection outlets are also available for normal single-phase service. An arc fault outlet may only protect the wiring downstream of it from arc faults by interrupting the power it feeds out. It may not protect the wiring upstream of it to the breaker panel. However, this is permitted by the Code providing that the wiring from the breaker panel to that first outlet is contained in metallic conduit. In fact the Code permits arc fault breakers to be omitted altogether for any circuit, the wiring for which is entirely contained in metallic conduit. Since arc fault breakers are considerably more expensive than regular overcurrent-only breakers, it is a valid option to consider whether use of conduit in new construction is more economic than Romex™ cable plus Arc Fault breakers.

An arc fault outlet of the prior art is not, however, designed to work with two live feeds. The design of new, inventive arc fault and GFCI outlets to work with two live feeds will be discussed further herein with reference to FIG. 6.

Figure 4:
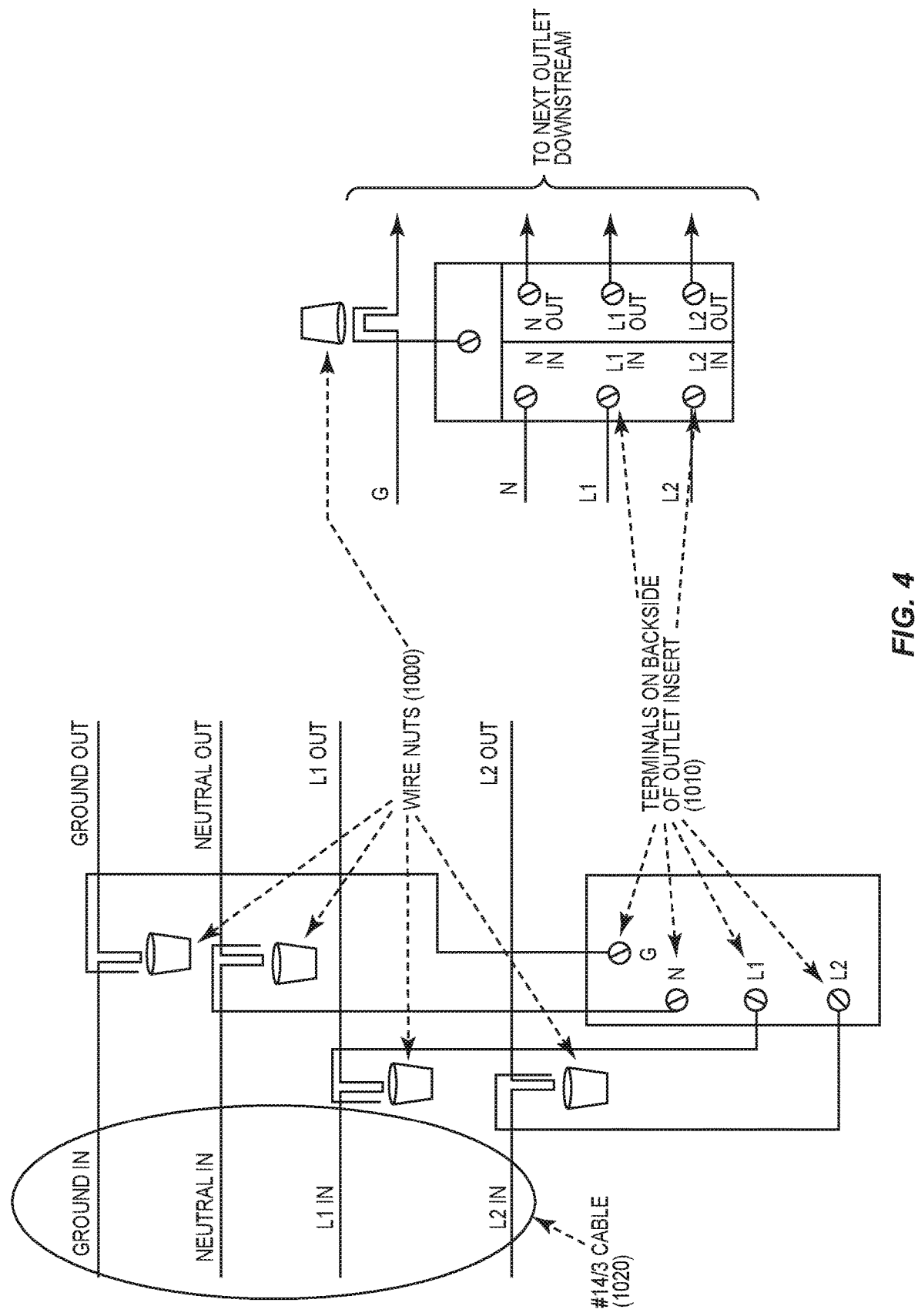
FIG. 4 is a wiring diagram depicting a first and a second type of power connection to an outlet.

Attention is now turned to construction of the outlets themselves. The outlets for the invention should preferably fit into normal in-wall electrical outlet boxes, be compatible with existing wall plates, and have terminals to receive a neutral, line from the first source, line from the second source, and ground. The outlet may optionally have terminals for passing on any of the live, neutral, or ground wires to the next outlet in an outlet chain, if this is not to be done with taps secured by wire nuts. An example of the need to have terminals for daisy-chaining other outlets is if the outlet provides a GFCI or AFCI function, which requires that it be able interrupt power to outlets further down the chain. FIG. 4 illustrates using taps with wire nuts and alternatively using daisy-chaining terminals.

On the left side of FIG. 4, the illustrated outlet has only four terminals (1010) on the back side—for ground, neutral, L1 from a first source, and L2 from a second source. A #14/3 cable comprising ground, neutral, L1, and L2 enters the outlet box and goes straight through and out again unbroken to the next outlet box, leaving only loops, stripped of insulation, for the attachment of taps. Taps are attached by means of twisting a short stub of wire to the loop using wire nuts, the short wire stubs then connecting to the appropriate ones of terminals (1010).

On the right hand side of FIG. 4 is shown an outlet with terminals for a cable in and a cable out. The ground wire might still go straight through unbroken and be tapped using a wire nut and short wire stub to provide the connection to the ground terminal of the outlet socket. The neutral and two lives are, however, severed and the incoming ends are attached to the L1, L2, and N "IN" terminals while the outgoing ends attach to the "OUT" terminals for carrying power to the next outlet downstream. This arrangement is used when the output shall have the capability to interrupt power to prevent it flowing further downstream, as in the case of a GFCI or AFCI outlet, which must be of a new inventive design to operate with the invention of FIG. 2 or 3.

Figure 5:
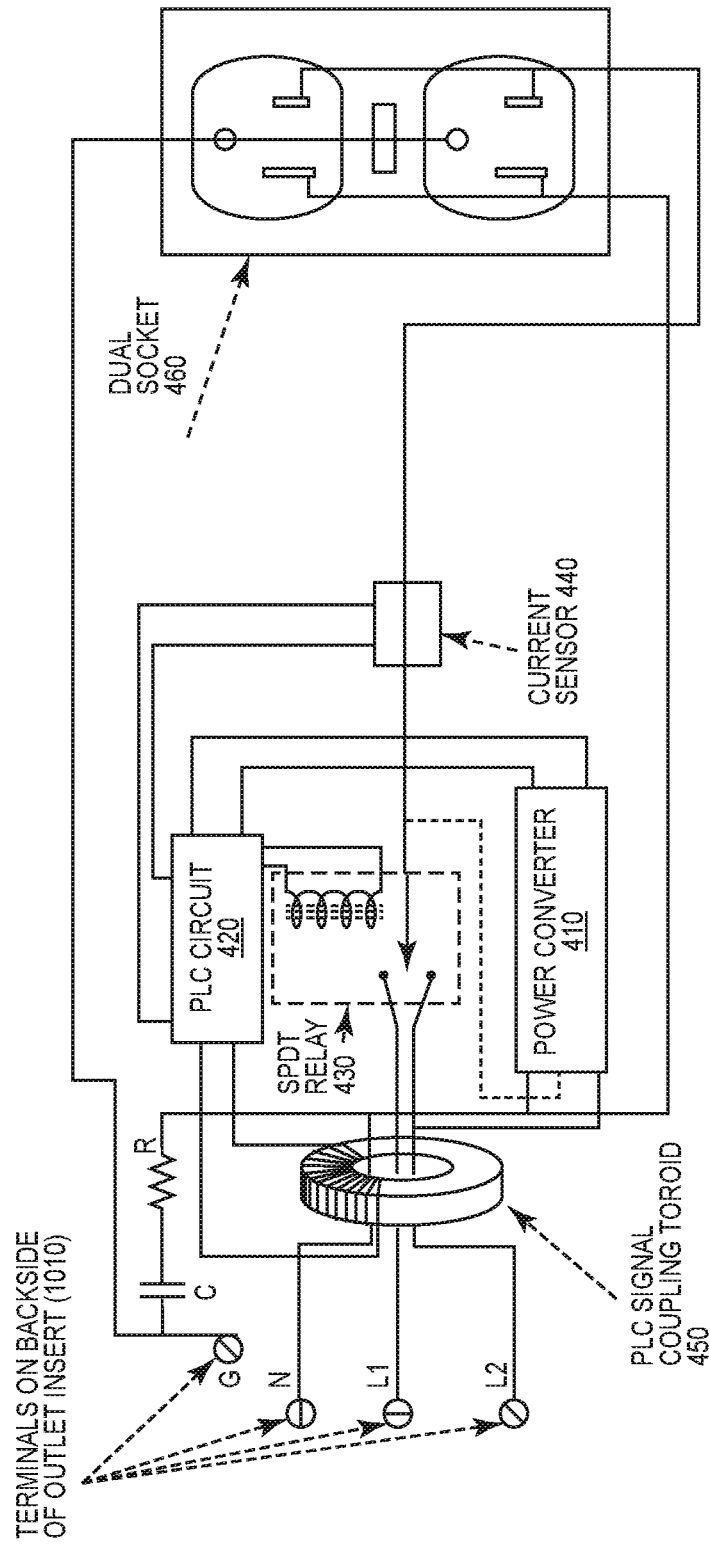
FIG. 5 is a schematic diagram of an inventive electrical outlet.

FIG. 5 shows more detail of the internal schematic of an inventive outlet. Two live lines (L1, L2), a neutral (N), and a ground (G) wire enter the outlet and connect to respective terminals (1010). The two live lines and the neutral pass through a communications signal coupling toroid (450), which has a secondary for picking off or inserting communications signals processed by Power Line Communications circuit (420). Power line communication is one convenient way to communicate between the outlet and a central controller, and is described more fully in U.S. Pat. No. 9,614,588 to present co-inventor Dent, incorporated herein by reference in its entirety. U.S. Pat. No. 9,785,213, also to inventor Dent et al. and also incorporated herein by reference in its entirety, additionally describes using Power Line Communications to communicate with individual outlets. The reader is referred to these two patents for further explanation and discussion of the series resistor R and capacitor C between neutral and ground shown in FIG. 5.

Power Line Communications is one way to communicate between a central control unit and each outlet because it is convenient, needing no setting up of network access and no extra wires. PLC circuit (420) could however be replaced by other communications circuits, such as a wireless communications circuit using Bluetooth, WiFi, Zigbee, or similar standards. As described in the above-incorporated patents, even when using a wireless network, it may still be advantageous to employ a signal transmitted over the power line from the central controller to the outlets to indicate to them, to which breaker circuit they are connected. Whichever method is used, the communications link is used in the direction central controller to outlet, or downlink, to send commands to control source selection relay (430) to select either a first power source supplied on L1, such as grid power, or the second source supplied on L2, such as solar-derived power. Communication in the opposite direction, or uplink, is useful for transmitting measurements of the current taken at the outlet by current sensor (440), which may for example be a pick up coil or Hall-effect sensor. PLC circuit (420) contains address decoding for the outlet, the relay driver for relay (430), and signal conditioning and encoding for communicating the current measured by current sensor (440).

Power converter (410) converts AC power input to DC required to power PLC circuit (420). The coil of relay (430) is likely to consume the majority of the power when energized, of about 0.9 watts. Considering that the number of outlets installed in a typical residence may be on the order of 100 or more, including outside receptacles and attic and basement outlets, the continuous power consumption if all relays were energized all the time would be significant, on the order of 90 watts. If lighting outlets were included in the scheme, this number could double. Since one of the main objectives is to reduce consumption of expensive grid power, the relays are preferably arranged to default to grid power (e.g., L1 in FIG. 5) in the unenergized state or if alternative energy (e.g., on L2) is not present. For example, connecting power converter (410) to the alternative power (L2) input in FIG. 5 results in the outlet consuming no power from utility ever. Alternative power must then be present for PLC circuit (420) to be functioning and to be able to energize the relay to select the alternative power for attached loads.

If, however, it is considered useful to continue to report current consumption from the outlet even when no alternative power is available, the power for PLC circuit (420) could alternatively by taken from both L1 and L2, or yet again from the power source selected by relay (430), by wiring the relay-selected power output to the power input of Power Converter (410), which is shown by a dashed line in FIG. 5. When the relay was powered, this would ensure that the 0.9 watts of power for its coil was not drawn from the grid, but would ensure that current sensor (440) and PLC circuit (420) were always powered up. A PLC circuit can be arranged to consume minimal power on standby by using techniques of "sleep modes" known from cell phone technology in which the circuit wakens only periodically in a predetermined timeslot to which it is assigned. However, if utility power fails while alternative power is available, an automatic response would have to be to switch the relay to alternative energy to ensure the PLC circuit was still powered up. If such behavior is not desired, then a solution may be used in which both relay selected power and the alternative power input are both fed to power converter circuit (410). This connection is shown dashed in FIG. 5, and has the result that, if both grid power and alternative power are available, and grid power is selected by the relay being deenergized, then relay power is never consumed from the utility. If on the other hand the grid fails, PLC circuit (420) will still be powered up to receive a command to control the relay (430) to select alternative power, if such is the decision by the central controller, or not. Moreover, detection of grid failure should be arranged to instantly awaken the PLC circuit (420) from any sleep mode that may be implemented to conserve power.

Detection of grid failure in the outlet implies voltage monitoring in the outlet. Accurate voltage measurement at the outlet can be useful if not measured elsewhere, such as in a central controller. In the central controller envisaged by this application, accurate measurement of the voltage of all sources is carried out and so it is not needed in the outlets, unless it is the simplest way to detect grid failure fast. A good way to detect grid failure fast is to detect that the voltage failed to reach some threshold percentage of the normal peak value in the last cycle, such as 85% Either an analog circuit or a digital circuit or software can be made to detect this criterion.

Figure 6:
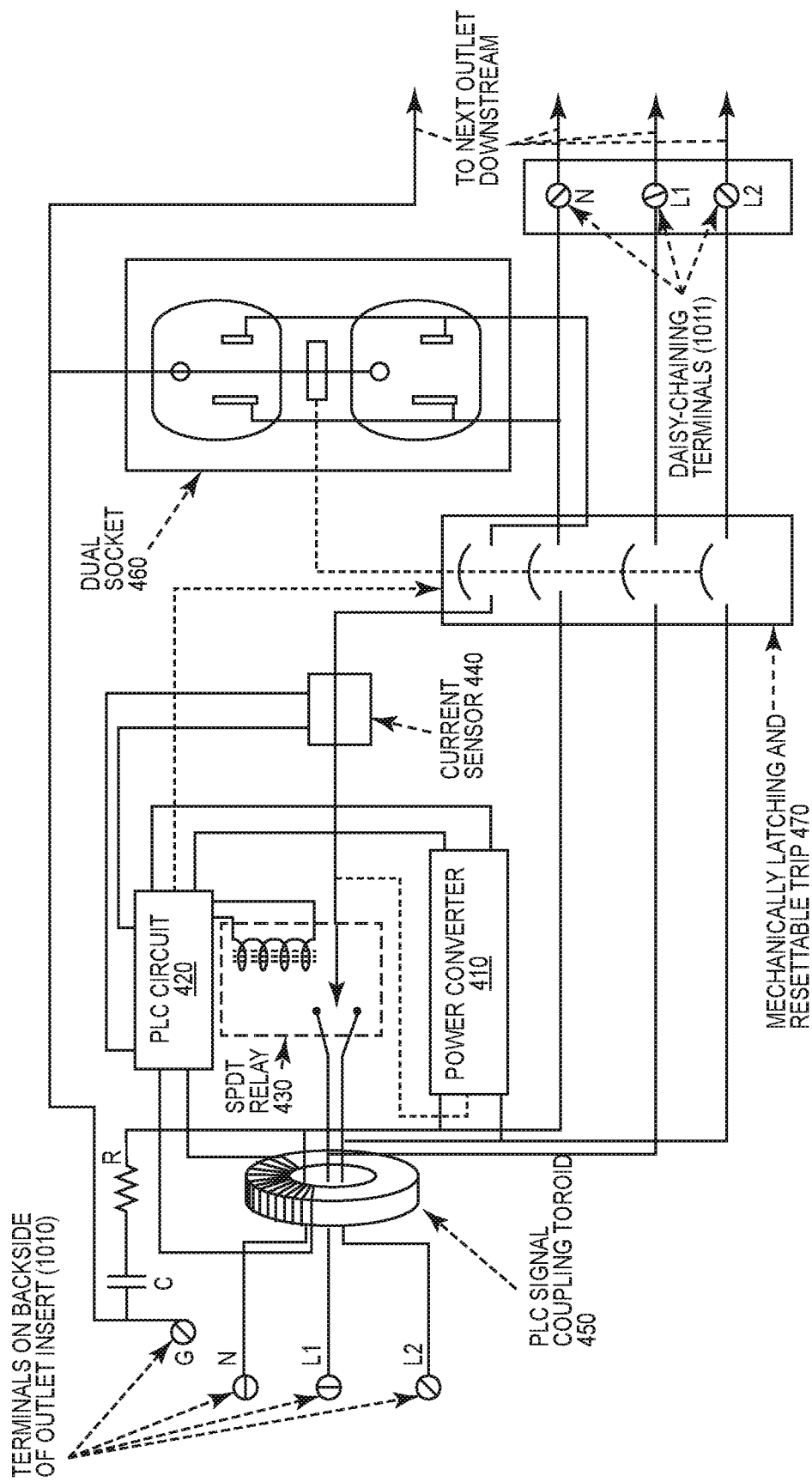
FIG. 6 is a schematic diagram of an inventive outlet having a GFCI function.

FIG. 6 illustrates another type of inventive outlet (400) that may incorporate a GFCI function and an AFCI function, at least for its own socket. The principal additions to FIG. 6 as compared to FIG. 5 are the 4-pole mechanical latching and resetable trip device (470) and daisy-chaining terminals (1011) for connecting to the outlets downstream.

For a GFCI function, it may be noted that measurement of a common mode signal is required for both PLC communications and for detecting GFCI current imbalance. Therefore it is of interest to see whether one and the same toroid (450) can fulfil both jobs. For powerline communications as disclosed in the incorporated applications, the toroid inductance is tuned to a predetermined carrier frequency. For GFCI, it is the 60 Hz component that must be measured. To measure the 60 Hz component, the secondary toroid winding can be connected through an inductor (e.g., 1 mH) with high impedance at the powerline communications frequency in the 100's of KHz region, but with low impedance at 60 Hz to a virtual-earth input amplifier to measure the 60 Hz imbalance current, while still permitting tuning at the PLC frequency.

The operation of a GFCI outlet according to FIG. 6 is as follows. PLC circuit (420) now has the dual function of picking off and inserting communications carrier signals flowing on the common mode of L1+L2+neutral relative to ground, as well as sensing the common mode current of L1+L2+N at the power line frequency (e.g., 60 Hz in the USA). If a command to do so is received on the communications signal frequency, PLC circuit (420) will control relay (430) to select either L1 or L2 to power the live pin of its own socket (460); the selected power source now however is routed through the mechanically latching and resettable trip device (440) to the live pin on socket (460). In common with other prior art GFCI devices, the neutral (460) is also routed through a second pole of trip device (470) to the socket and the daisy chaining terminals (1011). L1 and L2 lines are also routed through two additional poles of trip device (470) to daisychaining terminals (1011) to pass both sources' lines on to other downstream outlets so that they may make their own selection of power source independently of the socket of FIG. 6. The downstream outlets can be configured as per FIG. 5 and either have daisy-chaining terminals or not, as illustrated by the two options shown in FIG. 4.

If now PLC circuit (420) detects a common mode current at the power line frequency greater than a threshold, typically of the order of a few milliamps, it signals trip device (470) to open and thus remove power from its own socket (46) as well as interrupting both power sources from being passed to the downstream outlets, because the common mode current imbalance sensed by toroid (45) may have originated at any outlet downstream. Thus, the GFCI outlet of FIG. 6 provides GFCI protection for all outlets of the FIG. 5 type which may be connected downstream, while preserving their ability to independently select either power source.

While it would be desirable to be able to use the same toroid (450) for both powerline communications coupling and GFCI sensing, careful analysis is required to confirm the feasibility of this. A toroid that has been determined to be suitable for powerline communications is Ferroxcube part no. TX22/14/6.4-3D3 which provides a good Q-factor when tuned to frequencies in the 100's of KHz region. It has quite a high permeability of about 750 and provides an inductance of 454 nH per turn. Passing L1, L2, and N through the toroid effectively creates a one-turn winding and thus the inductance presented in series with common mode line current is 454 nH. This will develop a voltage of 0.5 uV approximately with an imbalance current of 3 mA. If the secondary winding is 30 turns, this is increased to 15 uV, which is well above thermal noise and therefore detectable.

Figure 7:
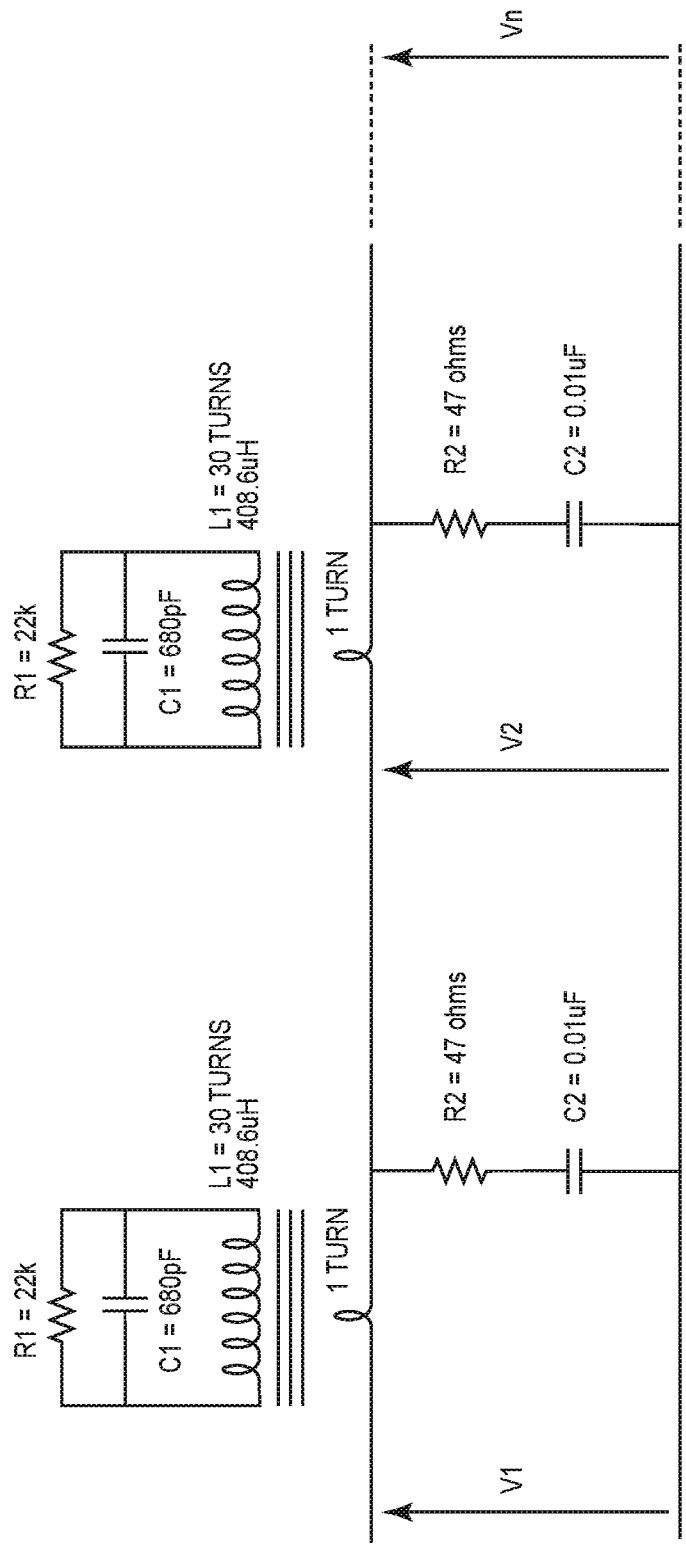
FIG. 7 is a schematic diagram depicting a circuit through which powerline communications signals may propagate.

The other consideration concerning the circuit of FIG. 6 is the propagation of the powerline communications signal down the outlet chain. The model for signal propagation for daisy-chained outlets is shown in FIG. 7. This model is for outlets that are chained by means of daisy chaining terminals according to the diagram on the right hand side of FIG. 4, as opposed to outlets that are tapped into the line and neutral wires according to the left side of FIG. 4. The latter was already analyzed in the above-incorporated patents. The model of FIG. 4 assumes that power daisy chained to downstream outlets has also passed through the toroid (450) of an outlet according to FIG. 5.

The model of FIG. 7 is simple to analyze. The resistance on tune presented by the toroidal transformer (450) to the series signal path is the 22 k of the resistive damping R1 on the 30 turn secondary, divided by the square of the turns ratio, giving 24.4 ohms which is approximately half of R2. This appears in series with the impedance coming from all the outlets downstream paralleled with R2. This iterative impedance may be determined to be approximately half of R2, or 24 ohms also. The attenuation of the input voltage V1 coming into the first outlet, i.e., the GFCI outlet, is thus 2:1, or −6 dB, so that the daisy chained signal level V2 is V1/2. The attenuation increases by a further 6 dB on passing through each subsequent outlet. In general, never are more than 10 outlets chained from a single 20 amp breaker, therefore the attenuation to the last outlet is 60 dB plus another 4 dB due to the chain ending there. If the signal transmitted from the controller is 1 milliwatt (0 dBm), the last PLC circuit (420) of the last outlet will therefore receive −64 dBm, which is still far above thermal noise and therefore easily decodable.

Figure 8:
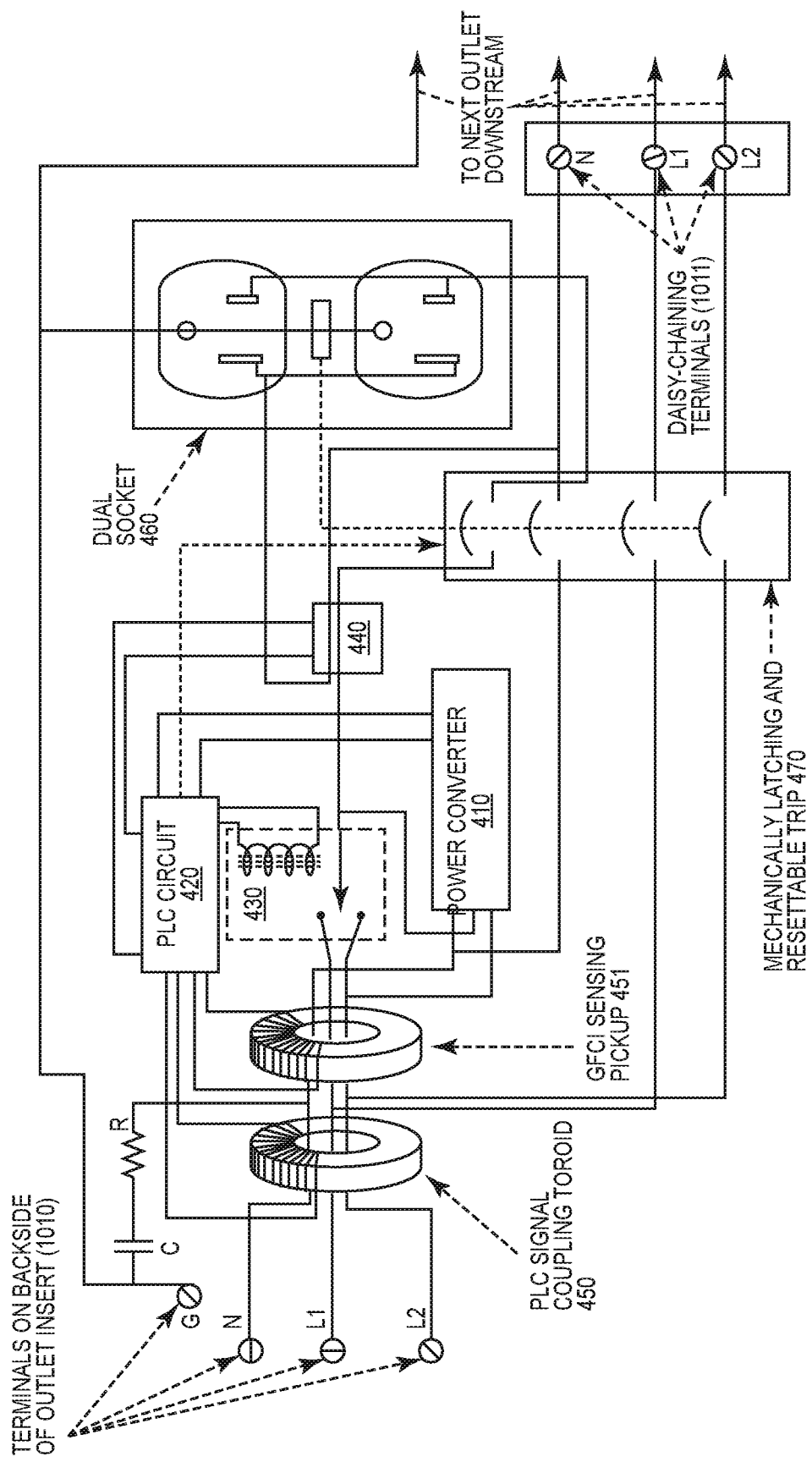
FIG. 8 is a schematic diagram depicting an inventive outlet with separate GFCI sensing pickup.

For completeness, FIG. 8 shows the schematic of a GFCI outlet in which separate toroids are used for picking off and inserting the powerline communications signal as compared with detecting a 60 Hz common mode current for GFCI purposes.

In FIG. 8, The PLC signal coupling toroid (450) is placed ahead (upstream) of the GFCI pickup (451) so that they can be optimized individually for their respective functions. Another change evident in FIG. 8 is that current sensor (44) now has the neutral current fed to own socket (460) flowing backwards through it relative to the line current, so that the current sensed is the sum of the line and neutral currents. The purpose of this is to permit circuit (420) also to perform an AFCI function for its own socket (460) at least. If the sum of the line and neutral currents exhibits a spectral characteristic indicative of arcing on either the neutral or line wire, then circuit (420) may actuate trip device (470) to interrupt the output from socket (460). A spectral characteristic of arcing is for example an elevated level of interharmonic energy, which is measured by performing an FFT on a 2-cycle long sampled and digitized current sample and looking at the relative level of odd harmonics of half the powerline frequency. Elevated high frequency content of the current is also an indication of arcing, and a combination of two or more indications provides more reliable detection. Two or more indications may be used together by regarding their values as the coordinates of a point in a multidimensional space, and pre-dividing the space into regions indicative of arcing and regions indicative of no arcing. Arcing is then detected by determining that the point represented by the multiple indications lies within a region that has been designated to be an arcing region.

Figure 9:
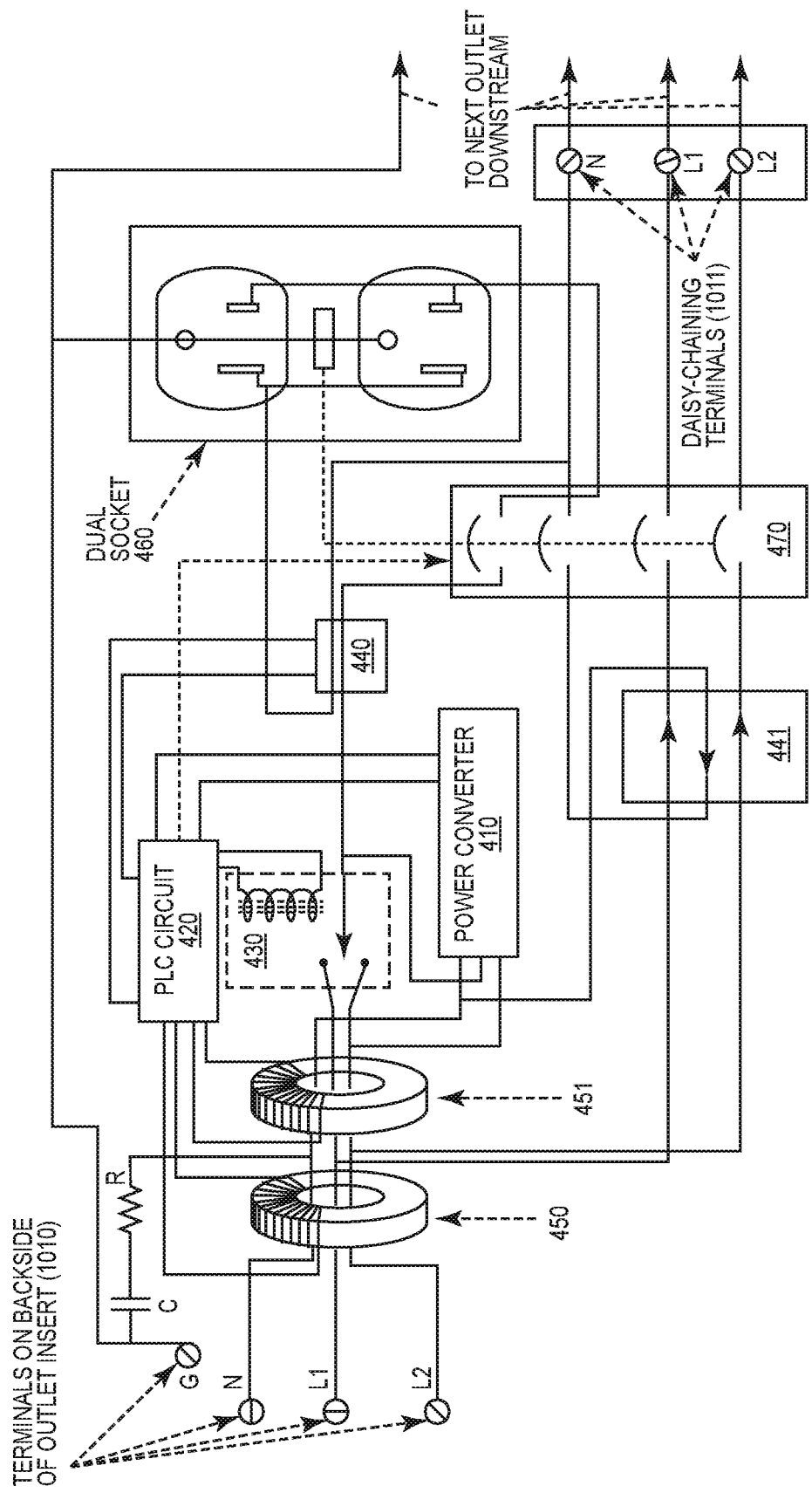
FIG. 9 is a schematic diagram depicting an inventive outlet for providing downstream arc fault protection.

FIG. 8 protects wiring from socket (460) to a load against arc faults, but does not protect upstream wiring or daisy-chain wiring. In order to protect downstream wiring, a second current sensor (441) is shown in FIG. 9 to measure current in the daisy chain wiring. Both current sensor (441) and (440) would typically sample the current at eight samples per cycle or more. A normal current consumed by a load is determined by calculating the fundamental sine and cosine component of the current at the powerline frequency from an exemplary eight samples per cycle. An interharmonic arc fault indication is obtained by performing a 16-point FFT on an exemplary 16 samples collected over a 2-cycle window, to obtain spectral components at 0, 30, 60, 90, 120, 150, 180, and 210 Hz, the interharmonic levels at 30, 90, 150, and 210 Hz normally being relatively low in the absence of arcing. Thus suitable sampling of the current at multiple samples per cycle followed by appropriate analysis can provide an indication of arcing, upon which circuit (420) would operate trip device (470) to interrupt downstream power. Thus is it is possible to conceive of an outlet that protects appliance wiring plugged into its own socket from arc faults without interrupting power to other sockets as well as detecting arcing in the daisy chain wiring which then results in interruption of power from all sources to all downstream outlets.

Figure 10:
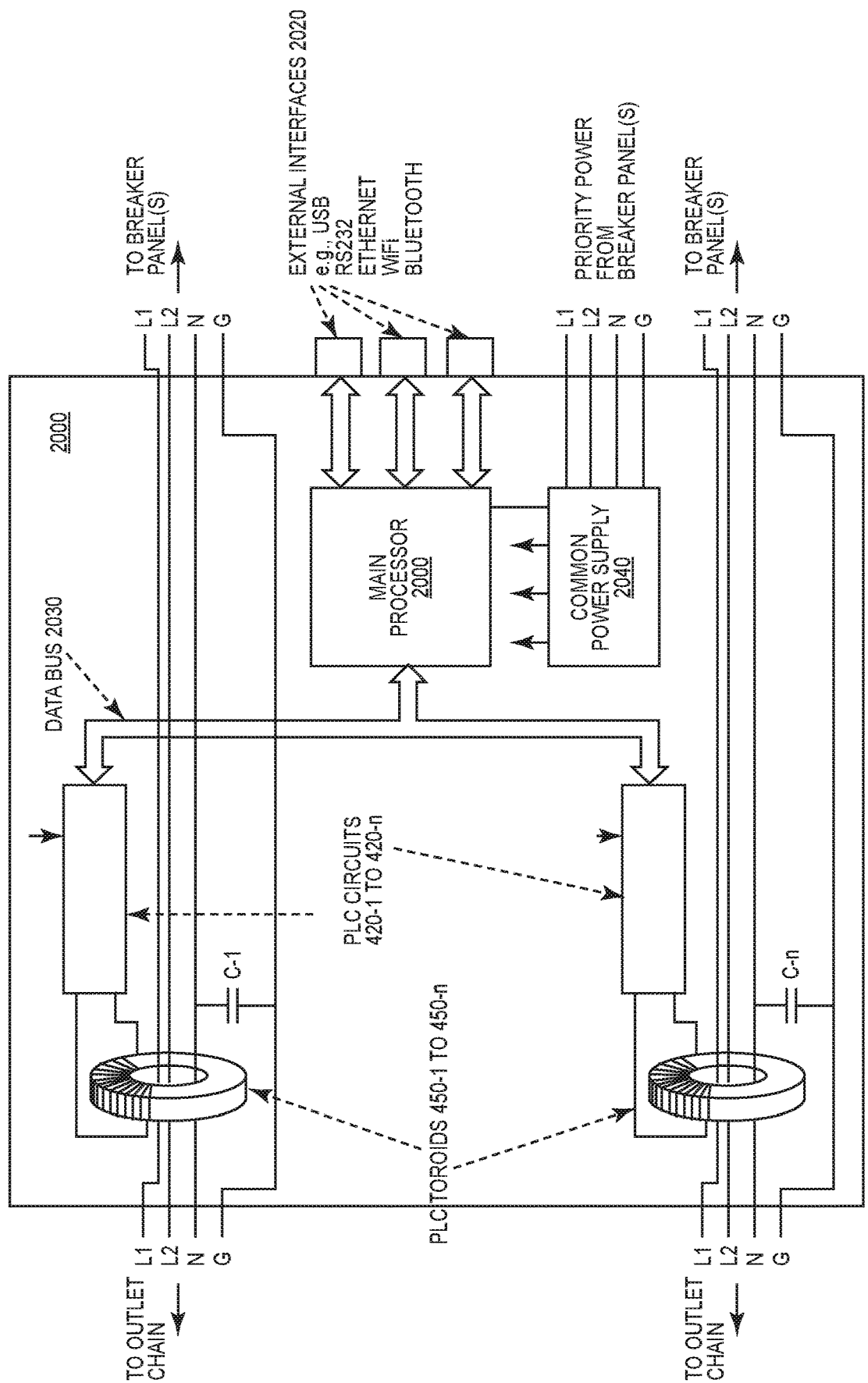
FIG. 10 is a block diagram depicting processing circuitry control.

An inventive controller for controlling any of the above-described types of outlet to select a first power source (e.g., grid power) or alternatively a second power source (e.g., a solar-charged battery-inverter system) is illustrated in FIG. 10. The controller is envisaged to be installed in close proximity to the breaker panels that provide power to the outlet chains, and may be designed to be installed flush with the Sheetrock™, as breaker panels typically are.

In FIG. 10, the cable selected to wire up each outlet chain, for example the #14/3 or higher gauge discussed above, is routed through controller box (2000) to the breaker panel or panels which are the sources of power. The insulation is stripped off in box (2000) in order to pass the L1, L2, and N wires through one of toroids 450-1 to 450-*n* but leaving the ground wire outside of the toroid center hole. After passing through a toroid, each Neutral wire is decoupled to its accompanying ground wire with the associated one of capacitors C-1 to C-n, which have impedances that are high at 60 Hz and low at the PLC signal frequency, in order to complete the PLC signal circuit. Optionally, the L1 and L2 wires may be decoupled to the neutral wire to reduce noise. They must not be decoupled to ground for safety reasons explained in the incorporated '822 and '588 patents. In European jurisdictions, it is not permitted to connect a capacitor from live to ground.

After passing through respective toroids (450-1 to 450-*n*) the L1, L2, N, and the ground wires are collected into one or more short conduit stubs for passing to the nearby breaker panels.

The secondary winding of each toroid 450 is connected to a respective one of PLC circuits 420-1 to 420-*n*. Each one of circuits 420-1 to 420-*n* may contain a powerline communications transmitter and receiver, if more than one is required to transmit or receive at the same time. Alternatively, a reduced number of powerline communication transmitters and receivers may be used that are time-shared between the toroids 450-1 to 450-*n* by allocating slots in a Time Division Multiplex manner. Slots may be permanently assigned or demand-assigned. Further description of the use of TDMA may be found in the above-incorporated '588 patent.

Processing circuitry, such as a main processor (2000), aggregates data received from each outlet concerning current consumption by their associated sockets. It also receives data via any of the external interfaces (2020) which may be in communication with user devices such as a PC, an internet server, or a solar energy system. The data may pertain to amount of solar power available, battery charge status, user priorities, and other set-up information. It may also aggregate data from a Smart Load Center built according to above-incorporated '703 patent in order jointly to decide on source selection switching actions. Loads are typically switched to solar in order to use all of the solar energy being received except for any that might be needed to recharge the associated battery. Loads my may also be switched to the battery irrespective of the amount of solar charge being received if the utility fails, while however ensuring that the total load does not exceed the inverter capacity. For the latter purpose it is useful to know not only the current consumption of all loads and outlets, but also to anticipate consumption. Consumption may be anticipated by accessing historical consumption patterns versus time-of-day and a stored appliance or circuit class code, which is one of the set-up parameters that may be stored in either the Smart Load Center built according to above-incorporated '703 patent or in controller (2000). The appliance or circuit class code indicates which of a limited number of algorithms shall be used for anticipating consumption—for example: actual current now; peak starting current (of a water pump for example); 3-sigma of the current consumption distribution of all outlets in a chain, from accumulated statistics—and any of these can be dependent on time of day. When not everything can be powered from the solar-charged battery-inverter system in a utility outage, reference is made to preset user priorities, which may also be different dependent on time-of-day.

Controller (2000) is powered by common power supply unit (2040) which receives priority power, possibly from a separate breaker in the breaker panel(s). It would receive all grid and inverter hotlegs available, so that if any one was alive, the controller would be powered up. It may optionally contain a small standby battery for bridging periods where no external power at all is available. Common power supply unit (2040) may also scale the voltages of all hotlegs supplied to it for digitization by main processor (2010). The main processor (2010) processes the voltage samples jointly with current measurements from the outlets to compute real and reactive power, and also to determine as fast as possible if a supply fails, in order to initiate action to switch loads to the alternative supply to avoid any glitch, as far as possible.

Thus it has been described above how the choice of, for example, grid power versus solar power can be extended down to each outlet. In the above, outlets having sockets for plug-in appliances have been mainly described, but exactly the same solutions can be applied to lighting outlets and chains of lighting outlets. Lighting outlets may not need GFCI protection, but may need AFCI protection, depending on the local electrical code and where they are located. Accordingly, as used herein, the term "outlet" means a terminal of an electrical power distribution wiring, operative to selectively power one or more electrical loads with power from a first or a second electrical source. The term "outlet" thus encompasses outlets having sockets for plug-in electrical loads; as well as a junction box providing "hard wired," dedicated power from the selected source to an appliance, such as a dryer; as well as a junction box providing power from the selected source to electrical loads installed as fixtures, such as lighting fixtures. As used herein, the terms "live," "line," and "power" wire or conductor are used interchangeably to refer to a "hot leg," or current-providing output, of an electrical power source (of either phase, in a split-phase system), and the term "neutral" wire or conductor refers to a wire carrying the return current. The term "common neutral" means a neutral wire or conductor electrically connected to the neutral terminals of both the first and second electrical power sources.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A dual-power electrical outlet operative to selectively power one or more loads from a first Alternating Current (AC) power source or a second AC power source different than the first AC power source, in response to commands from a controller, comprising:
   a first line input terminal operative to connect to a power conductor from the first AC power source;
   a second line input terminal operative to connect to a power conductor from the second AC power source;
   a neutral terminal operative to connect to a common neutral conductor connected to both the first and second AC power sources;
   a communication circuit operative to receive a power selection command from the controller; and
   a single pole, double throw functionality switch operative to direct power from either the first line input terminal or the second line input terminal to connected loads, in response to the power selection command.

2. The dual-power electrical outlet of claim 1, further comprising a ground terminal operative to connect to a ground conductor grounded at the first AC power source.

3. The dual-power electrical outlet of claim 2, further comprising a receptacle operative to accept one or more electrical plugs, each connected to a load, and to electrically connect a power contact of each plug to the switch.

4. The dual-power electrical outlet of claim 2, wherein the single pole, double throw functionality switch comprises a SPDT relay.

5. The dual-power electrical outlet of claim 2, further comprising:
a first current sensor operative to sense the electrical current output to the one or more loads; and
wherein the communication circuit is further operative to send current measurements from the first current sensor to the controller.

6. The dual-power electrical outlet of claim 5, wherein the first current sensor is operative simultaneously to sense a current component at a powerline frequency for measuring power consumption at the outlet and a current component not at the powerline frequency indicative of an arc fault in the wiring to a connected load.

7. The dual-power electrical outlet of claim 5, wherein the communication circuit is a power line communication circuit operative to communicate with the controller by common mode signals on the first power, second power, and neutral conductors, relative to ground.

8. The dual-power electrical outlet of claim 7, wherein the communication circuit comprises a magnetic toroid having a secondary winding, and through which the first and second power inputs pass, the same toroid being configured to simultaneously extract or inject a modulated carrier for powerline communications, and to sense a common mode current at a powerline frequency to provide a ground fault indication.

9. The dual-power electrical outlet of claim 2, further comprising:
a first line output terminal operative to daisy-chain power from the first AC power source to downstream outlets; and
a second line output terminal operative to daisy-chain power from the second AC power source to downstream outlets;
a neutral output terminal operative to daisy-chain the common neutral to downstream outlets; and
a ground output terminal operative to daisy-chain the ground to downstream outlets.

10. The dual-power electrical outlet of claim 9, further comprising:
a mechanically latching four-pole trip circuit operative to interrupt connections to the first line output terminal, second line output terminal, neutral output terminal, and between the switch and connected loads, in response to detection of a common mode current at a powerline frequency on the first and second line inputs and neutral input in excess of a predetermined threshold.

11. The dual-power electrical outlet of claim 10, further comprising:
a second current sensor operative to sense a common mode current on the first and second line outputs and neutral output; and
processing circuitry operative to determine from the common mode current whether an arc fault has occurred in downstream wiring; and wherein the mechanically latching four-pole trip circuit is further operative to interrupt power output to downstream outlets in response to the processing circuitry determining that an arc fault has occurred.

12. The dual-power electrical outlet of claim 2, wherein power from the first electrical power supply and the second electrical power supply are AC power of opposite phase.

13. The dual-power electrical outlet of claim 2 further comprising:
a first power conductor from the first AC power source connected to the first line input terminal;
a second power conductor from the second AC power source connected to the second line input terminal;
a common neutral conductor connected to both the first and second AC power sources connected to the neutral terminal; and
a ground conductor grounded at the first AC power source connected to the ground terminal;
wherein the first and second power, neutral, and ground conductors comprise a wiring chain using a cable or conduit.

14. The dual-power electrical outlet of claim 13 further comprising:
a first circuit breaker in a first electrical distribution panel associated with the first AC power source providing power to the first power conductor; and
a second circuit breaker in a second electrical distribution panel associated with the second AC power source providing power to the second power conductor;
a panel connecting cable or conduit run between the first and second electrical distribution panels, the panel connecting cable or conduit run containing:
a power conductor from the second AC power source;
one of a neutral conductor from the second AC power source and a common neutral conductor of adequate ampacity; and
a ground conductor from the second AC power source; and
a neutral buss in the first electrical distribution panel to which neutral conductors connected to the dual-power electrical outlet are connected;
wherein the second AC power source neutral or common neutral conductor from the panel connecting cable or conduit run connects to the neutral buss in the first electrical distribution panel.

15. The dual-power electrical outlet of claim 13 further comprising:
a mechanically ganged 2-pole circuit breaker in a split-phase electrical distribution panel that is powered on one phase from the first AC power source and on the other phase from the second AC power source; and
wherein the 2-pole circuit breaker is connected to the first and second power conductors.

16. The dual-power electrical outlet of claim 13 wherein the neutral conductor is of at least twice the ampacity of either the first or second power conductor.

17. The dual-power electrical outlet of claim 13 wherein the first and second line input terminals and neutral and ground terminals connect to the respective conductors via terminal connections, and further comprising:
a first line output terminal operative to connect to a power conductor to provide power from the first AC power source to one or more downstream dual-power electrical outlets;

a second line output terminal operative to connect to a power conductor to provide power from the second AC power source to one or more downstream dual-power electrical outlets;

a neutral daisy-chain terminal operative to connect the common neutral to a neutral conductor connected to one or more downstream dual-power electrical outlets; and a ground daisy-chain terminal operative to connect the ground to a ground conductor connected to one or more downstream dual-power electrical outlets.

18. An electrical outlet controller operative to control a plurality of dual-power electrical outlets individually to selectively supply connected loads with electrical power from a first AC power source or a second AC power source different than the first AC power source, comprising:

processing circuitry operative to determine, for each individual dual-power electrical outlet, whether the outlet should power connected loads from the first or second AC power source; and communication circuitry operative to address a power source selection command individually to each dual-power electrical outlet.

19. The controller of claim 18, wherein the communication circuitry is further operative to receive, from one or more dual-power electrical outlets, information on the current output to connected loads.

20. The controller of claim 18, further comprising an external interface to a Smart Load Center (SLC) operative to switch at least some circuits between the first and second AC power sources, the interface allowing the controller and SLC to coordinate total power consumption from the first or second AC power sources.

* * * * *